United States Patent [19]

Planovsky et al.

[11] 4,171,335

[45] Oct. 16, 1979

[54] CONTACT PLATE FOR MASS-EXCHANGE COLUMNS

[76] Inventors: Alexandr N. Planovsky, ulitsa Kropotkina, 8, kv. 11, Moscow; Vladimir P. Pavlov, ulitsa Shmidta, 18, kv. 34, Schelkovo Moskovskoi oblasti; Valery E. Trubkin, Gruzinsky val, 18/15, kv. 77, Moscow; Evgeny V. Fedotov, Serpukhovsky val, 22, korpus 3, kv. 102, Moscow; Jury V. Tetivkin, Slavyansky bulvar, 47, kv. 103, Moscow; Oleg L. Ershov, ulitsa Ostrovityanova, 45, kv. 275, Moscow; Alexei A. Volchenko, Varshavskoe shosse, 10, kv. 169, Moscow; Gaioz A. Pagava, ulitsa Mayakovskogo, 20, kv. 5; Zurab Y. Kervalishvili, prospekt Lenina, 14, kv. 6, both of Rustavi; Vladislav V. Smyslov, Proletarsky prospekt, 64, korpus 4, kv. 102, Moscow; Vadim F. Belugin, ulitsa Lenina, 37, kv. 56, Fryazino Moskovskoi oblasti, all of U.S.S.R.

[21] Appl. No.: 845,731

[22] Filed: Oct. 26, 1977

[51] Int. Cl.² ............................................... B01F 3/04
[52] U.S. Cl. .................................... 261/155; 165/60; 202/158; 261/79 A; 261/114 JP; 261/156

[58] Field of Search ................ 261/79 A, 109, 114 R, 261/114 VT, 114 JP, 114 A, 148, 153, 156, 161, 112, 155; 202/158; 165/60

[56] References Cited

U.S. PATENT DOCUMENTS

| | | | |
|---|---|---|---|
| 1,918,005 | 7/1933 | Urquhart | 261/114 A |
| 1,948,500 | 2/1934 | Bielfeldt | 261/114 A |
| 2,401,569 | 6/1946 | Koch | 261/114 JP |
| 2,690,060 | 9/1954 | Legatski | 261/148 X |
| 3,233,879 | 2/1966 | Mitchell | 261/79 A |
| 3,589,689 | 6/1971 | English | 261/114 JP |
| 3,792,843 | 2/1974 | Stage | 261/153 X |
| 3,807,143 | 4/1974 | Dunn | 261/79 A X |

FOREIGN PATENT DOCUMENTS

| | | | |
|---|---|---|---|
| 717851 | 2/1942 | Fed. Rep. of Germany | 261/114 A |
| 755019 | 11/1933 | France | 261/114 A |
| 265067 | 6/1970 | U.S.S.R. | 261/114 A |

*Primary Examiner*—Richard L. Chiesa
*Attorney, Agent, or Firm*—Steinberg & Blake

[57] ABSTRACT

A contact plate for mass-exchange columns comprises a base having receiving and discharge pockets for liquid. The base also supports concave troughs, each trough extending between the receiving pocket and the discharge pocket having its walls provided with apertures for the passage of gas extending tangentially in the same direction to form gas flows whirled in a direction transversely of the trough toward one of the side edges thereof which is provided with a guide apron comprising an extension of the trough wall.

12 Claims, 8 Drawing Figures

CONTACT PLATE FOR MASS-EXCHANGE COLUMNS

BACKGROUND OF THE INVENTION

The invention relates to the equipment for conducting mass- and heat-exchange processes and deals with the construction of contact plates for gas and liquid reaction. The contact plate according to the invention may be most advantageously used in column apparatus for separation of gas and liquid mixtures by the methods of refining and absorption, for catching dust and other solids from gases with liquids. The invention will find application in the chemical, petrochemical oil refinery and other industries.

There is a widely known contact plate for column apparatus comprising a base having apertures for the passage of ascending gas flow therethrough and supporting receiving and discharge pockets for liquid. In operation of the apparatus, liquid which gets to the plate base is distributed thereover to define, upon reaction with gas, an interphase contact surface at which physico-chemical processes occur, and the liquid flows towards the discharge pocket. Such is the organization of flow in the sieve, valve, cap and other types of contact plates having discharge means.

However, in view of evergrowing volume of processed starting products and more stringent requirements imposed on quality of separated products, more attention is given in the Soviet and foreign practice to the development and employment of highly active and efficient contact plates for stable operation over a wide load range, which permit higher flow velocities in the apparatus, while retaining high separating ability.

This problem may be most successfully solved by providing, on the contact plate, a directive gas flow into the liquid or directive gas flow from the liquid. For that purpose, the admission of gas to the contact plates is effected by using oriented scales, valves, plates and apertures. In order to prolong the residence time of liquid, the apertures are frequently made in different directions. To reduce secondary mixing and eliminate stagnation zones, the contact plates are divided by means of partition walls into a number of longitudinal or transverse sections. The same sections are intended to serve as separators of liquid from gas, that is to reduce losses.

The analysis of operation of the prior art contact plates, however, shows that they have a number of disadvantages: either low velocity of gas in the apparatus, or narrow range of stable operation; either short residence time of the flows or considerable losses of liquid to the upper contact plates (the partition walls may be a source of secondary losses); either non-uniform distribution of liquid over the working surface of the contact plate or substantial secondary mixing of liquid, or insufficient development of the interphase surface. The provision of means for application and removal of heat on the plate may result in substantially impaired hydrodynamic situation at the contact plate.

SUMMARY OF THE INVENTION

It is an object of the invention to improve the throughput capacity of apparatus using contact plates.

Another object of the invention is to improve quality of separation of mixtures at the contact plate.

The above objects are accomplished by providing a contact plate comprising a base having apertures for the passage of ascending flows of gas therethrough and supporting receiving and discharge pockets for liquid. According to the invention, the base has concave troughs extending between the receiving pocket and the discharge pocket, and the apertures for the passage of gas are formed in the walls of the troughs to extend longitudinally in the same direction to form gas flows whirled transversely relative to the troughs, and guide aprons comprising extensions of the troughs are provided at the side edges of the troughs on the side from which the whirled gas escapes, i.e., the sides towards which the whirled gas flows from the apertures.

This construction of the base of the contact plate enables a material increase in the gas velocity in the apparatus in which the plate is used and improves the throughput capacity in terms of liquid. With a high velocity of directive flow of gas into the liquid, several zones with developed interphase surfaces are formed on the troughs. First, there is a zone of gas penetration into liquid, where a large number of drops and bubbles are formed. Second, there are drops and bubbles thrown by the gas flow against the guide aprons to define a second contact zone thereon. Thirdly, the gas leaving the troughs passes through the drops and jets of liquid separating from the guide aprons to define a third interphase zone. Liquid particles flow along the trough from the receiving pocket towards the discharge pocket along a helical path under the action of the directive gas flow thus prolonging the time of gas and liquid contact.

With such construction of the base, the loss of liquid from the plate is substantially eliminated due to centrifugal separation even with very high velocities of gas. Longitudinal partitioning of the plate by means of non-communicating troughs enables maximum possible utilization of the motive force of the mass-exchange process (due to the elimination of non-uniform distribution of liquid over the plate base).

The plate is preferably provided with baffle plates secured to the side edges of the troughs on the side opposite to the separation of whirled gas flows therefrom i.e. on the side opposite the direction of the gas flow, the plates comprising extensions of the walls of the troughs, and the upper extremities of the baffle plates are inwardly bent such that the insignificant amount of liquid that is lost after the centrifugal separation, can be finally retained. Moreover, an additional, fourth zone of liquid and gas interaction is provided at the baffle plates.

For more efficient utilization of the working space of the apparatus, the adjacent troughs may adjoin to one another with their side edges, and a partition wall is secured to the side edge of each guide apron in such a manner that the partition wall and the guide apron define together a baffle plate for the adjacent trough.

To eliminate the downfall of liquid returned back to the trough from the guide aprons, a discharge plate extending to the interior of the trough is preferably secured to the side edge of the trough opposite to the edge to which the guide apron is secured, the discharge plate defining a diverging passage, and a jet of gas erupts from under the discharge plate along the entire length thereof so that the liquid flowing from the discharge plate is gas cushioned. This provision substantially enlarges the lower operating range of the contact plate.

A cylindrical pipe is preferably secured over the trough to extend therealong. Thus, the hydrodynamics of the flow is substantially improved since the provision of an annular passage between the pipe and the trough organizes the flow of gas and liquid and prevents gas and liquid from bypassing along the trough.

Transverse ridges may be secured to the outer periphery of the pipe thus improving the efficiency of mass exchange since an additional, fifth zone of gas and liquid reaction is provided at the pipe.

The pipe is preferably provided with heat carrier admission and discharge means since in a number of applications to chemical manufacture, admission or removal of heat to and from the apparatus is required, and the pipe having a heat carrier admission and discharge means substantially enlarges the field of application of the contact plate.

The apertures for the passage of gas preferably extend at a certain angle relative to the generatrix of the trough providing for the gas flow displacement toward the discharge pocket, thus improving the transfer of liquid from the receiving pocket to the discharge pocket and reducing secondary mixing of liquid.

BRIEF DESCRIPTION OF THE DRAWINGS

The invention will now be described with reference to specific embodiments thereof illustrated in the accompanying drawings, in which.

DESCRIPTION OF PREFERRED EMBODIMENT

Figure 2:
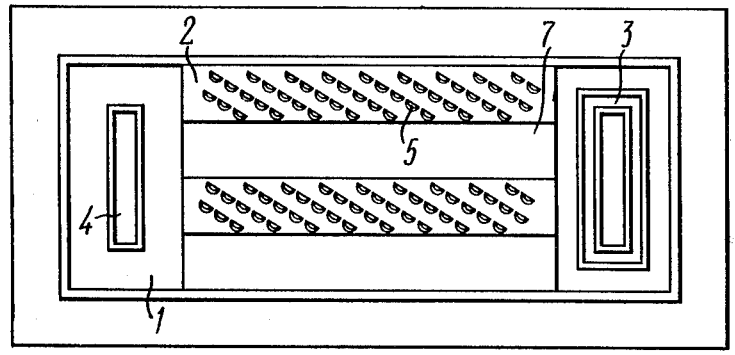
FIG. 2 is a plan view of the contact plate of FIG. 1.
Figure 3:
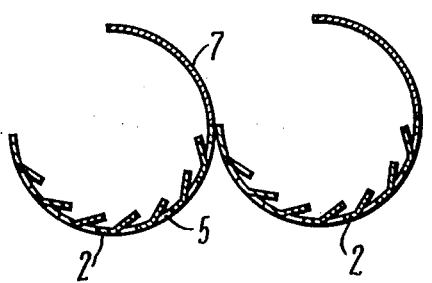
FIG. 3 is a cross-sectional view of the troughs of the contact plate according to the invention.

The contact plate for mass-exchange columns for conducting liquid and gas reactions comprises a base 1 (FIGS. 1, 2) having concave troughs 2 extending from a liquid receiving pocket 3 towards a discharge pocket 4. The adjacent troughs 2 may be either spaced along the base 1 or adjoin to one another at their side edges as shown in FIG. 3. The walls of the troughs 2 have apertures 5 made in the form of scales or otherwise shaped perforations which extend tangentially in the same direction. This construction of the base 1 (FIG. 1) enables directing the gas flow in a whirling configuration about the longitudinal axis of the trough 2 and the consequent whirling, by means of the gas flow, of liquid which gets to the trough 2 from the receiving pocket 3. In order to intensify the transfer of liquid towards the discharge pocket 4 and to reduce secondary mixing of liquid, the apertures 5 extend at a certain angle $\alpha$ relative to the generatrix of the trough 2 to ensure the displacement of the gas flow towards the discharge pocket 4.

To eliminate the loss of liquid drops from the edge of trough 2 upwards, it is necessary to change the direction of movement of the gas and liquid flow in such a manner that the liquid be returned back to the trough 2, and the liquid free gas get to the contact plate located at higher level in a mass-exchange column 6. This is achieved by means of a guided apron 7 (FIGS. 1, 3) secured to the side edge of the trough 2 on the side of separation of the whirled flow of gas therefrom i.e. the side toward which the gas flow is initially directed, the apron comprising an extension of the wall of the trough 2.

To completely eliminate the overflow of liquid from one trough to another, as well as to preclude insignificant loss of liquid to the upper contact plate, the edge of the trough 2 may be provided, on the side opposite to the separation of the whirled gas flow therefrom, with a baffle plate 8 (FIG. 4) comprising an extension of the wall of the trough 2. The upper extremity of the baffle plate 8 is inwardly bent. The baffle plate may be shaped, e.g. as cycloid in section. This shape of the baffle plate contributes to gravity and inertial separation of liquid.

Figure 5:
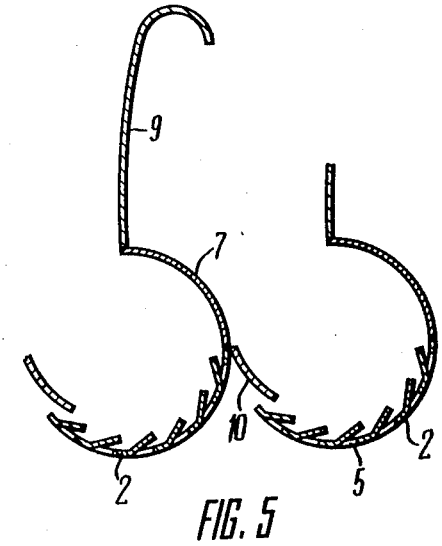
FIG. 5 is a cross-sectional view of the troughs of the contact plate having partition walls on the guide aprons and discharge plate, according to the invention.

In the case where the adjacent troughs 2 adjoin to one another at their side edges, a partition wall 9 (FIG. 5) may be secured to the side edge of each guide apron 7 in such a manner that the partition wall 9 and the guide apron 7 define together a baffle plate for the adjacent trough 2. This provision enables more efficient utilization of the space of mass-exchange column.

When liquid is returned back from the outer side of the guide apron 7 to the trough 2, downfall of liquid may occur through the lower part of the trough 2. In order to eliminate the downfall, a discharge plate 10 is provided along the trough 2 to extend to the interior of the trough 2, which is secured to the side edge of the trough 2 opposite to the edge to which the guide apron 7 is secured. The shape and dimensions of the discharge plate 10 depend on the shape and dimensions of the trough 2.

Figure 6:
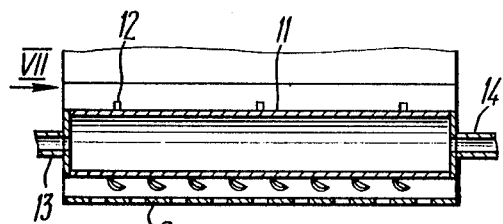
FIG. 6 is a longitudinal section of the troughs of the contact plate having a ridged cylindrical pipe, according to the invention.
Figure 7:
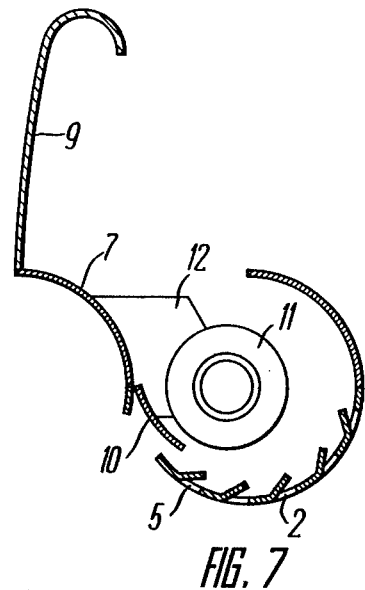
FIG. 7 is an enlarged sectional view taken along the arrow VII in FIG. 6.

A cylindrical pipe 11 (FIGS. 6, 7) may be secured over the trough 2 to extend therealong and to define an annular passage between the pipe 11 and the trough 2 so as to further organize the flow of gas and liquid.

The pipe 11 is eccentrically mounted relative to the trough 2. The space between the pipe 11 and the trough 2 should be such that liquid should be able to freely return back to the trough 2 through the space. Transverse ridges 12 are secured to the outer periphery of the pipe 11. The ridges 12 perform a double role: first, they are used to secure the pipe 11 to the trough 2; second, they prevent liquid from bypassing and secondary mixing. In case it is necessary to apply or remove heat, the pipe 11 is provided with heat carrier admission or discharge means including pipes 13 and 14.

Figure 8:
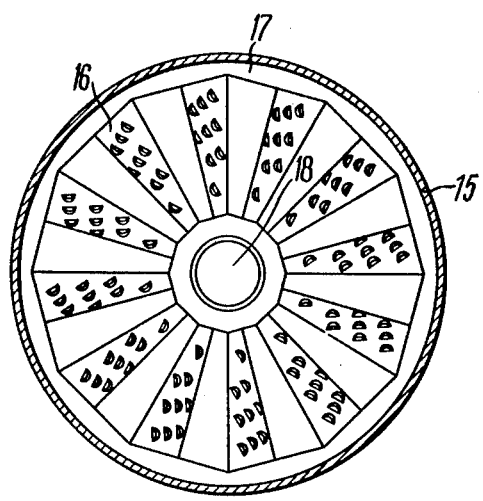
FIG. 8 shows the arrangement of the troughs on the contact plate for a round mass-exchange column, according to the invention.

The mass-exchange column 6 (FIGS. 1, 2) is of rectangular cross-section. It should be noted that the contact plate can also be used in a mass-exchange column 15 (FIG. 8) of round section. The base of such plate has concave troughs 16 extending radially between a receiving pocket 17 and a discharge pocket 18.

The contact plate for gas and liquid reaction functions in the following manner.

First, the reference is made to the pattern of gas flow movement since it is of a decisive importance for the distribution of liquid in the active zone of the contact plate where the interphase surface is developed. At low gas velocity, the gas flow ascends in the mass-exchange column 6 (FIG. 1) to pass through the apertures 5 without whirling at the troughs 2. At higher velocities of gas, the ascending gas flow passes at high velocity through the apertures 5 to be whirled in a direction towards the guide apron 7 as shown by arrows in FIG. 4. The gas moves along the guide apron 7 and leaves it to flow towards the baffle plate 8, to slide thereover upwards and, after changing the direction of flow at the top once again, leaves for the upper contact plate. The above-described pattern of gas flow movement does not change also in the case of the provision of the discharge plate 10 (FIG. 5) or the ridged cylindrical pipe 11 (FIG. 7) on the trough 2, which can only make the hydrodynamic effect stronger.

Figure 1:
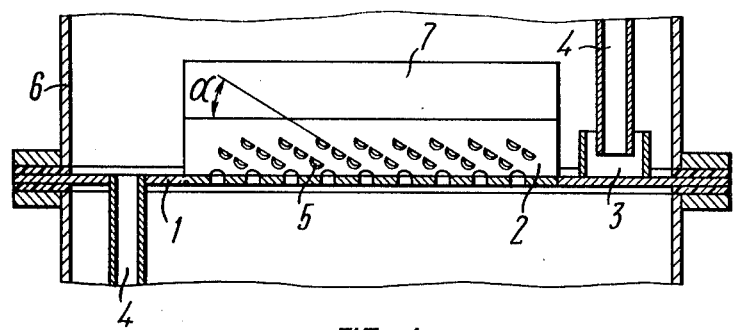
FIG. 1 diagrammatically shows a longitudinal section of a part of a mass-exchange column and the contact plate according to the invention.

In accordance with the above-described gas flow performances, the reference is now made to the operation of the contact plate with a gas-liquid system. In case the gas velocity is low, liquid which gets to all troughs 2 from the receiving pocket 3 (FIG. 1) forms a bubbling layer upon reacting with gas similarly to prior art sieve or cap plates. With substantial increase in gas velocity, liquid gets to the trough 2, is entrained by gas jets leaving the apertures 5 of the trough 2, atomized and thrown under the action of centrifugal force against the surface of the guide apron 7. During the flow of liquid along the guide apron 7, the liquid is decelerated thus resulting in a material increase in the relative velocity of flow of phases to intensify the mass-exchange process. Liquid jets reaching the edge of the guide apron 7 are thrown under the action of centrifugal force against the baffle plate 8 (FIG. 4) to cross the gas flow and to intensely react therewith. Upon hitting at the baffle plate 8, the liquid returns therealong back to the trough 2. Since the apertures 5 of the trough 2 extend towards the guide apron 7 and the discharge pocket 4 (FIG. 2), the liquid flows over the trough 2 along a helical path. The liquid returned back to the trough 2 from the baffle plate 8 (FIG. 4) is thus displaced towards the discharge pocket 4 (FIG. 1). All the above results in reduction of secondary mixing of liquid and increase in its residence time on the trough 2.

In the case wherein the discharge plate 10 (FIG. 5) is provided on the trough 2, the liquid flows down thereto along the baffle plate defined by the partition wall 9 and the guide apron 7 of the adjacent trough 2, and a gas jet erupts from under the discharge plate 10. Therefore, the direction of movement collateral with the direction of gas flow movement is imparted to the liquid returned back to the trough 2. This contributes to the dispersion of liquid and prevents it from falling down through the apertures 5 of the trough 2. Due to the provision of the discharge plates 10, the contact plate starts operating at lower velocity of gas.

In the case where the ridged cylindrical pipe 11 (FIG. 7) is provided, gas moves in the annular passage defined by the trough 2 and the cylindrical pipe 11. The liquid which gets to the trough 2 is entrained by the gas flow and moved in the field of centrifugal forces in the form of jets and drops. Upon reaching the edge of the guide apron 7, the liquid is thrown against the partition wall 9 under the action of inertia forces to be returned therefrom back to the trough 2. A certain fraction of liquid which is lost is separated at the surface of the cylindrical pipe 11 and moves therealong in the form of a film.

As the pipe 11 is mounted eccentrically, a hydroseal is defined between the pipe 11 and the discharge plate 10 to prevent gas from bypassing therebetween and to contribute to uniform entrainment of liquid with gas.

The ridges 12 provided on the pipe 11 prevent the liquid from flowing along the pipe 11. Therefore, the provision of the annular passage results in whirling the flow at lower velocities of gas in the apertures 5 so that the lower range of operating loads in terms of gas is enlarged. Due to the provision of the gas and liquid contact zone at the cylindrical pipe 11, the interphase surface increases.

For application and removal of heat to and from the gas and liquid contact zone, an appropriate heat carrier is fed through the cylindrical pipe 11. In such case, a favorable hydrodynamic situation at the outer periphery of the pipe makes a positive effect on the efficiency of heat transfer process as well.

Figure 4:
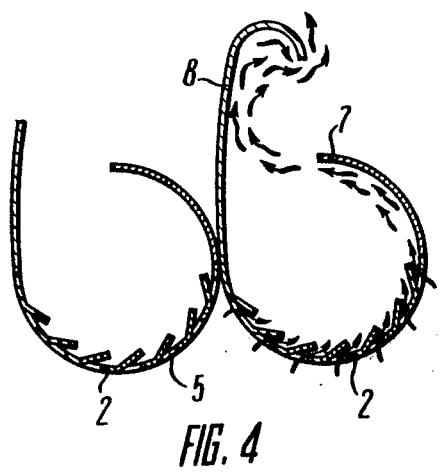
FIG. 4 is a cross-sectional view of the troughs of the contact plate having guide aprons and baffle plates, according to the invention.

The liquid passed over the troughs 2 gets to the discharge pocket 4 (FIG. 1). It is noted that no devices for baffling intensive gas and liquid flows directed towards the walls of the mass-exchange column 6 are required as is the case of the prior art flat jet-type plates. In this case, the liquid leaves the troughs 2 at a low velocity. The gas and a small amount of drops entrained thereby move upwards along the baffle plate 8 (FIG. 4). Upon reaching the upper extremity of the inwardly bent plate the gas changes the direction of flow to become free of the drops and leaves for the upper contact plate.

We claim:

1. A contact plate for mass-exchange columns comprising: a base; a pocket communicating with said base for receiving liquid; a pocket communicating with said base for discharging liquid; at least one longitudinally extending trough provided on said base extending between said receiving and discharge pockets, said at least one trough having a continuously curved side wall having upwardly extending side wall portions defining a concavely curved transverse cross-section, a plurality of apertures formed in said trough side wall extending substantially tangentially to said side wall in the transverse direction toward one of said side wall portions for the passage of gas therethrough toward said one of said upwardly extending side wall portions; and a guide apron provided on said one of said upwardly extending side wall portions comprising a substantially continuous extension thereof and having an upper terminal edge; whereby gas directed through said apertures form whirls in a transverse cross-section of the trough, said gas flow travelling over said one of said side wall portions to said guide apron and upwardly over said terminal edge portion thereof.

2. A contact plate according to claim 1 comprising: at least two of said troughs, each trough including a baffle plate comprising an upwardly extending extension of the other of said side wall portions of said trough; the upper extremities of said baffle plate being inwardly bent to extend over said trough.

3. A contact plate according to claim 2, further including a discharge plate secured to the other side wall portion of the trough, said discharge plate extending to the interior of the trough.

4. A contact plate according to claim 1, comprising: at least two troughs, each trough contiguously adjoining an adjacent trough at the side wall thereof; partition walls secured to and upwardly extending from said guide aprons such that the partition wall and the associated guide apron of each trough define a baffle member for the adjacent trough.

5. A contact plate according to claim 4, further including a discharge plate secured to the other side wall portion of the trough, said discharge plate extending to the interior of the trough.

6. A contact plate according to claim 1, further including a discharge plate secured to the other side wall portion of the trough, said discharge plate extending to the interior of the trough.

7. A contact plate according to claim 6 further including a cylindrical pipe arranged within said trough to extend therealong.

8. A contact plate according to claim 1 further including a cylindrical pipe arranged within said trough to extend therealong.

9. A contact plate according to claim 8 further including means for admission and discharge of heat carrier to and from said pipe.

10. A contact plate according to claim 8 wherein ridges are secured to the outer periphery of said pipe transversely thereof.

11. A contact plate according to claim 10 further including means for admission and discharge of heat carrier to and from said pipe.

12. A contact plate according to claim 1, wherein said apertures for the passage of gas extend at a certain angle relative to the generatrix of the trough whereby the gas flow is directed towards said discharge pocket.

* * * * *